United States Patent
Müller et al.

[11] 3,712,175
[45] Jan. 23, 1973

[54] MACHINE TOOL WITH INCLINED ADJUSTABLE CARRIAGE IN AN INCLINED GUIDE ARRANGED ON THE COLUMN OF THE MACHINE TOOL

[75] Inventors: Johann Müller, Unterhaching; Leonhard Gschwendtner, Walchstadt, both of Germany

[73] Assignee: Friedrich Deckel Aktiengesellschaft, Munich, Germany; by said Katharina Muller, legal representative and heir of Johann Muller, deceased

[22] Filed: Dec. 10, 1970

[21] Appl. No.: 96,783

[30] Foreign Application Priority Data

Dec. 12, 1969 Germany.....................P 19 62 484.1

[52] U.S. Cl............................90/16, 90/17, 90/11 R, 408/234, 408/236
[51] Int. Cl................................................B23c 1/12
[58] Field of Search....90/17, 16, 11 R; 408/234, 236

[56] References Cited

UNITED STATES PATENTS

| | | | |
|---|---|---|---|
| 3,577,828 | 5/1971 | Stickney | 90/17 |
| 2,504,968 | 4/1950 | Eklund | 90/17 |
| 1,976,107 | 10/1934 | Archea | 90/17 |

FOREIGN PATENTS OR APPLICATIONS

| | | | |
|---|---|---|---|
| 1,241,231 | 5/1967 | Germany | 90/17 |

*Primary Examiner*—Gil Weidenfeld
*Attorney*—Woodhams, Blanchard & Flynn

[57] ABSTRACT

A machine tool having a carriage adjustable in an inclined guide arranged on a column. A tool head having a work spindle is arranged so that the spindle is perpendicular to the driving axis of the tool head. The tool head is driven by means of a driving motor and gearing provided therefor and is pivotable and lockable about an axis which is parallel to the front of the column. A transversely movable carriage is adjustably supported on the inclined carriage and is adjustable in a horizontal guide which is perpendicular to the front of the column. An adapter is pivotally and lockably secured to the transversely movable carriage about an axis which is perpendicular to the front of the column. The adapter has a torque transmitting means connecting the drive shaft of the gearing to the drive shaft of the tool head. The adapter includes means for releasably connecting a plurality of different types of tools to the tool machine to thereby improve the versatility of the tool machine.

5 Claims, 14 Drawing Figures

Fig.1

INVENTORS
JOHANN MULLER
LEONHARD GSCHWENDTNER

BY Woodhams, Blanchard & Flynn
ATTORNEYS

MACHINE TOOL WITH INCLINED ADJUSTABLE CARRIAGE IN AN INCLINED GUIDE ARRANGED ON THE COLUMN OF THE MACHINE TOOL

The invention relates to a machine tool having an inclined carriage adjustable in an inclined guide arranged on the column of the machine tool and a tool head which is driven by means of a driving motor through gearing in a gear housing which is pivotable and lockable about an axis which is parallel to the front of the column, said tool head having a work spindle which is perpendicular to the swivel axis of said tool head.

A milling machine with an inclined carriage which is adjustable in an inclined guide is already known from U. S. Pat. No. 2,504,968. The inclined guide is inclined downwardly from the front of the column toward the rear. A tool head is supported for rotation and is lockable in a vertical plane which is perpendicular to the front of the column on the inclined carriage, which tool head can be driven by means of a driving motor through gearing contained in the inclined carriage. This construction offers the advantage that the tool can be maintained during horizontal and vertical adjustment of the work spindle at an approximately uniform height above floor. This makes possible the convenient adjustment of the workpiece carrier, which adjustment otherwise is required in a horizontal position and is disadvantageously high, and further makes possible the operation of the machine during a horizontal position of the work spindle with the operator in a sitting position. However, it is disadvantageous in that a transverse movement of the work spindle, which, for example, is adjusted vertically, by means of the inclined carriage is not practical because with such a "transverse movement" the working height is changed and the effective working zone adjacent the front of the column is diminished. The advantage exists thus only at an upwardly adjusted inclined carriage and a vertical work spindle and a downwardly adjusted inclined carriage and a horizontal work spindle especially since the height of the working zone, due to the use of a knee table, is in any case limited. A swinging of the tool head and therewith of the work spindle in a plane which is parallel to the front of the column is not possible and this further limits the scope of use of this machine. In order to place the tool head and the work spindle centrally to the column and the table, the column is laterally enlarged and is further provided with a recess in this enlarged section, which recess carries the inclined carriage in the inclined guide. This arrangement necessitates a high material cost. Further, the arrangement of the driving motor and the gearing in the inclined carriage, due to an unavoidable heat expansion, causes an interference of the position of the work spindle during vertical operation. Finally the overarm is supported on the inclined carriage so that it constitutes a considerable projection and it must, therefore, be constructed rigidly and this requires the use of much material to prevent deflection.

The basic purpose of the invention is to produce a machine tool in which the above-discussed disadvantages are avoided while yet maintaining the advantage given by the inclined guide itself, and in which there is obtained a greater vertical working zone which permits an adjustment of the tool head and the work spindle at any desired angle relative to a workpiece and without changing the working height. Thus a universal range of use is obtained while at the same time, the machine is characterized by a simple operating manner which is favorable in all operating positions and is further characterized by an economical design.

As above indicated the invention relates to a machine tool having an inclined carriage adjustable in an inclined guide arranged on a column and a tool head having a work spindle which is perpendicular to the driving axis of said tool head, said tool head being driven by means of a driving motor and gearing and being pivotable and lockable about an axis which is parallel to the front of the column. In such a machine, these purposes above outlined are attained (1) by supporting a transverse carriage adjustably on the inclined carriage which is kept suitably low in a horizontal guide which is perpendicular to the front of the column, (2) by holding an adapter pivotably and lockably about an axis which is perpendicular to the front of the column on the section of the transverse carriage adjacent the work zone, (3) by connecting the driving motor and the gearing on one side a gear box and on the other side thereof arranging the tool head on the adapter, pivotably and lockably about an axis which is parallel to the front of the column and (4) providing the adapter with a torque transmitting means for connecting the driven shaft of the gearing and the drive shaft of the tool head. Through this the tool head with the work spindle is adjustable in any desired angle, also in a plane parallel to the front of the column, and is transversely movable in each angular adjustment without changing the height above the floor and particularly without reducing the vertical working zone. Heat which is radiated by the driving motor and the gearing does not act on any elements which determine the position of the tool carrier so that a detrimental effect on the precision of work as a result of heat expansion is avoided to a great extent and a precise operation is possible.

Furthermore, according to the invention, the adapter and the tool head or rather the torque transmitting means and the drive shaft of the tool head are releasably connected for applying interchangeable tool heads at this connecting point, for example, a cutter head with or without feed, slotting head, grinding head, boring head, or a driving element for the spindle of the copying device. In this manner, at any desired angular adjustment and height-maintaining transverse adjustability of the tool or the respective work spindle, a practically unlimited useability of the machine is obtained so that, for example, slotting operations in a horizontal direction are also possible. Of a particular advantage is the interchangeability of tool heads as compared with known attachments in that the tool head — without connected carriage and without connected driving motor and gearing — can be changed by a single operator without the help of lifting equipment which results in a high economy and an easy handling.

According to a further embodiment of the invention, the gear box is arranged on the adapter at a right angle to its swivel axis and to the swivel axis of the tool head so that the gear box is in a position which does not face the working zone and does not hinder the working zone and observation of same.

Furthermore, according to the invention, the gear box — at a one-sided projection — is supported for rotation and is lockable on the adapter through which the gear box, depending on the position of the work spindle and operating process, can be brought into a position which is free from the other parts of the machine and does not hinder the visual observation of the working process. At the same time this construction permits, if gearing to effect a change of speed, for example like a variometer, is used, an arrangement of the adjusting scale or reading scale in such a manner that it can be easily monitored in each position chosen by the operator.

According to a further embodiment of the invention, the transverse carriage — changeable in its horizontal guide — is equipped with a feed.

In this embodiment of the invention a vertical table is advantageously provided on the column in place of the knee table, through which it becomes possible to clamp different tables or the like or also the workpiece itself on the vertical table. Thus, the function of the transverse movement can be performed alone by the transversely movable carriage guided on the inclined carriage. These advantages of the vertical table are of special importance in a machine tool which is constructed according to the basic thought of the invention because through this there is obtained a better use of the vertical working zone and a favorable operating manner. By this means the effect desired and achieved by the invention by the arrangement of a vertical table is achieved in a remarkable manner.

A further inventive construction consists in arranging the inclined guide approximately centrally to the column and arranging the flange, laterally offset, off-center on the end section of the transverse carriage, so that the tool head and the work spindle — in normal position of the adapter — are in a position centrally to the column. This construction additionally offers the advantage of a saving of material since herefor neither a lateral enlarged section of the column nor an additional groove is required.

Furthermore, it is suggested according to the invention that the inclined carriage is divided in a horizontal plane and, in its parts, is constructed to be pivotable and lockable about a vertical axis through which the tool head and the work spindle, for special uses, can be brought into a mostly off-center position with which, in connection with the choice of angular adjustment possibilities of the work spindle, the field of application of the machine is considerably increased.

A mostly off-center position of the work spindle is also made possible by dividing, according to the invention, the transversely movable carriage at a horizontal plane and by constructing it, in its parts, so that it is pivotable and lockable about a vertical axis, whereby — in connection with the feed of the transversely movable carriage — in an advantageous manner, an off-center adjusted work spindle with transverse feed can be loaded.

Finally, according to the invention, a support for the releasable fastening of an overarm and a copying device having a feeler is provided on the adapter, preferably on its side not facing the transversely movable carriage, through which the overarm, which can also serve for receiving a feeling device in place of an end support, can be relatively short so that it does not easily deflect and can further be made with a minimum of work and expense. At the same time, the overarm can be swung together with the adapter which considerably facilitates the adjusting or setting up of the tool machine and the observation of operating processes. Thus this connecting surface is a considerable contribution to the universal use of the tool machine.

The invention is illustrated schematically and in form of an example in the drawings in which.

In a machine tool, according to FIGS. 1 to 11, an inclined guide 3 is arranged on a column 1 having a pedestal plate 2. The inclined guide 3 is inclined rearwardly and downwardly from the front 4 of the column 1. A carriage 5 is adjustably guided on the inclined guide 3 and, by means of locking elements 6, such as set screws is lockably securable on the inclined guide 3.

A transversely movable carriage 8 is adjustably supported on the carriage 5, which carriage 8 is kept suitably low, in a horizontal guide 7 which is positioned on the upper surface of the carriage 5 and is perpendicular to the front 4 of the column 1. The transversely movable carriage 8 is equipped, according to FIGS. 2 to 10, with a schematically illustrated transverse feed device 10, such as a conventional screw and traveling nut or rack and pinion, operable by means of a handwheel 9. A bellows 11 is used for protecting the guide.

An adapter 13 is pivotably supported on a flange 12 on the section 8a of the transversely movable carriage 8 and is lockable about an axis 13' which is perpendicular to the front 4 of the column 1. The section 8a faces the working zone. The flange 12 is laterally offset (off-center) on the end section 8a of the transversely movable carriage 8 while the inclined guide 3 to the column 1 is centrally arranged.

A driving motor 14 is mounted on a gear housing 16 which houses and gearing 15. The housing 16 is swingably and lockably secured to the adapter 13. The gearing 15 is connected by means of a flange 17 through a tool head 18 having a work spindle 18a. The tool head 18 is pivotable and lockable about an axis 18B which is parallel to the front 4 of the column 1 and the work spindle 18a is perpendicular to the swivel axis of said tool head 18 in FIGS. 1 and 2 and FIGS. 8 to 11 or to one of the tool heads 19 to 23 in FIGS. 3 to 7.

The gear housing 16 is arranged on the adapter 13 at a right angle to its swivel axis and at a right angle to the swivel axis of the tool head 18 or one of the tool heads 19 to 23. The adapter 13 is provided with a schematically illustrated torque transmitting device 13B for connecting the not illustrated driven shaft of the gearing 15 and the driving shaft of the tool head 18 (or 19 to 23). The offset gear housing 16 is swingably and lockably supported on the adapter 13. The gearing 15 is controlled by a speed-changing mechanism which is operated by means of an adjusting member 24 and an adjusting scale 25.

Figure 1:
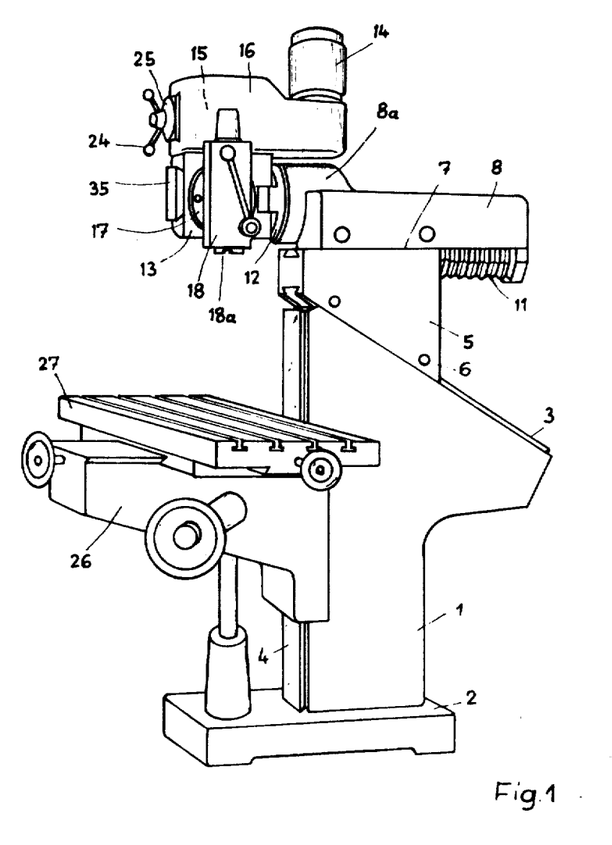
FIG. 1 is a machine tool with a tool head in the vertically aligned position and knee or bed type table.
Figure 2:
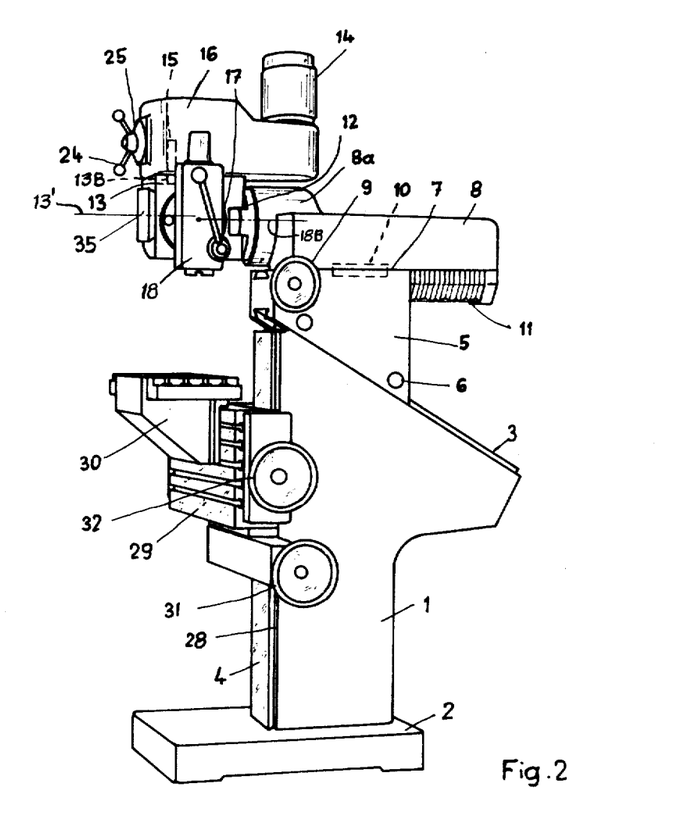
FIG. 2 illustrates the machine tool, however, with a vertical table.
Figure 3:
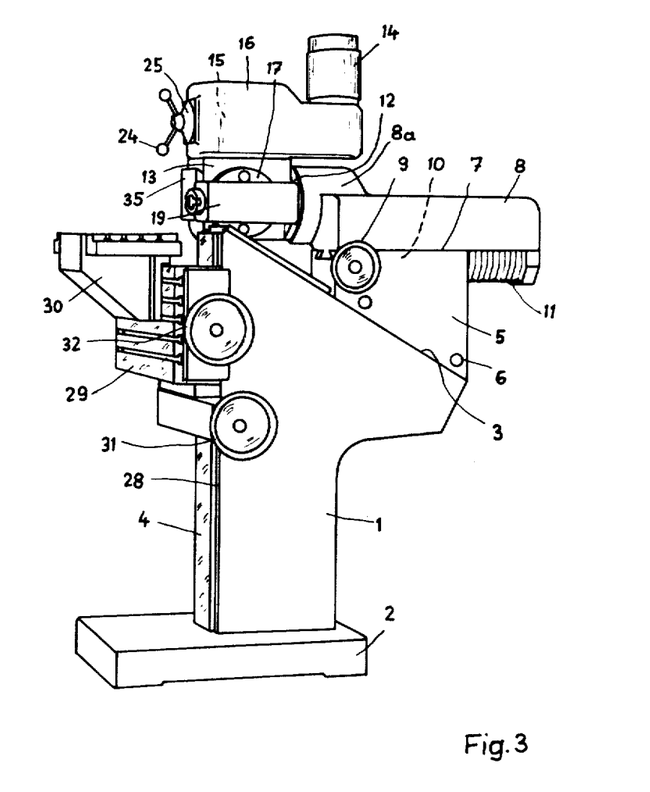
FIG. 3 illustrates the machine tool with the tool head in a horizontal position.
Figure 4:
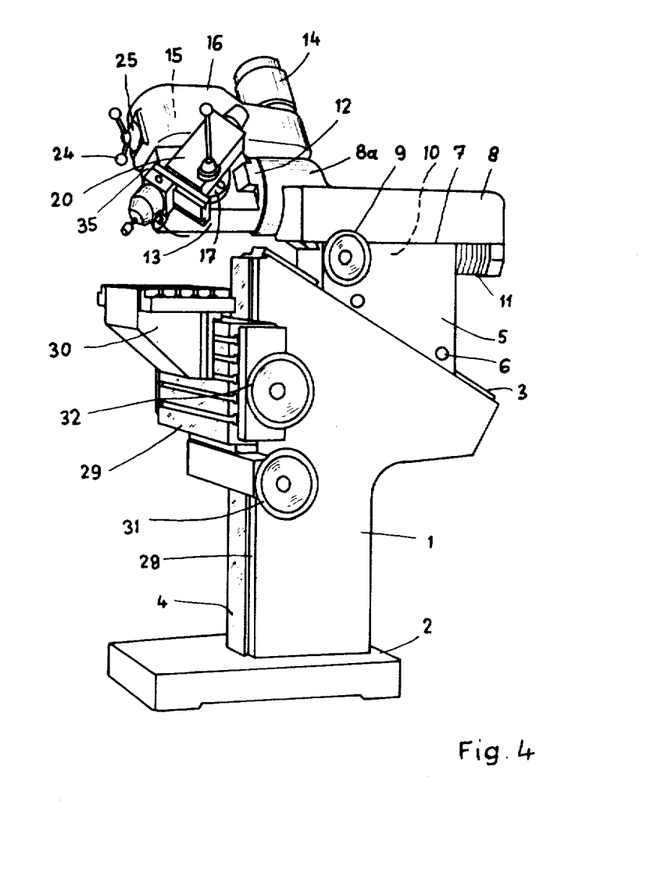
FIG. 4 illustrates the machine tool with the tool head in an angular position pointing away from the front of the column and inclined toward the observer.
Figure 5:
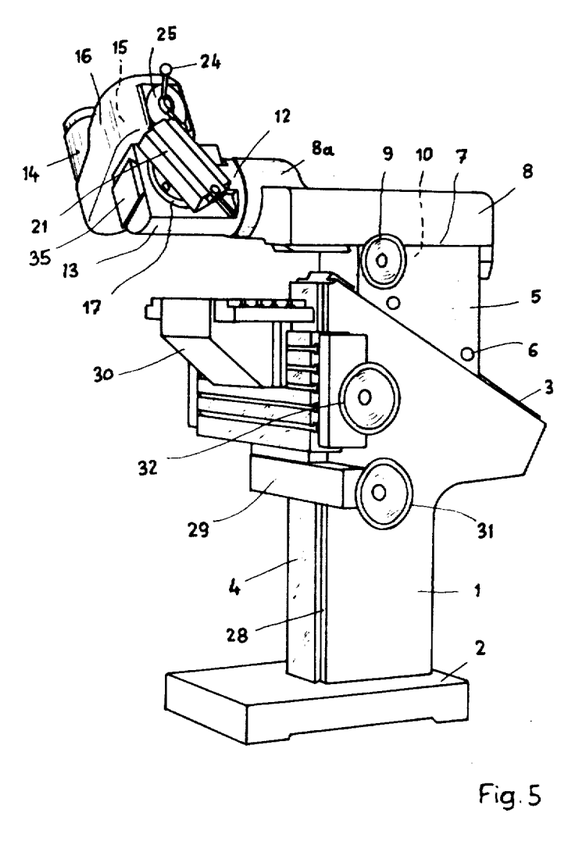
FIG. 5 illustrates the machine tool with the tool head in an angular position inclined toward the front of the column and toward the observer.

According to FIG. 1, a bed 26, having a cross-slide table 27 is guided for vertical movement on the front 4 of the column 1, which column is provided on the pedestal plate 2.

According to FIGS. 2 to 11, a vertically movable table 29 is arranged on the column 1 and is guided for vertical movement in a vertical guide 28. An additional table 30 is secured to said vertical table 29. The vertical table 29 is vertically adjustable relative to the guide 28 by means of a conventional hand-wheel driven mechanism 31 and the additional table 30 is guided in the horizontal direction by means of a conventional handwheel driven mechanism 32.

According to FIGS. 6 to 9, the inclined carriage 5 is divided into two parts by a horizontal plane and its parts 5a and 5b are relatively pivotable about a vertical axis and are lockable by means of a locking element 33 such as a conventional set screw.

Figure 10:
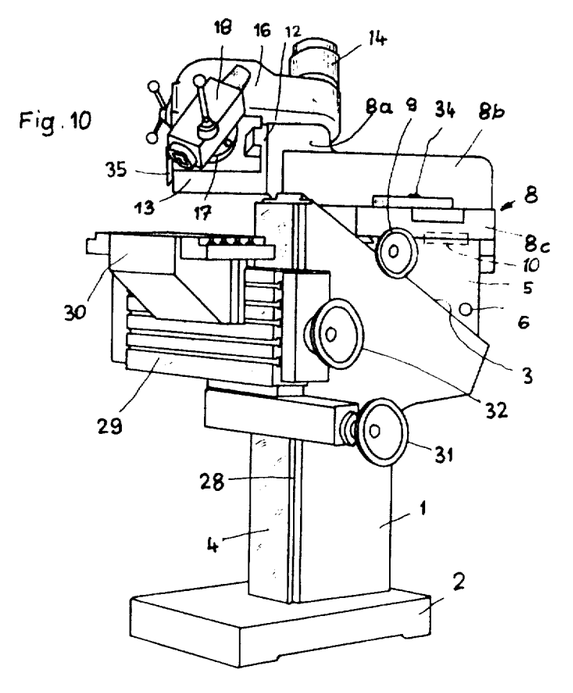
FIG. 10 illustrates a different machine tool, similar to the ones according to FIGS. 1 to 5, with the tool head in an off-center angular position pointing away from the front of the column.
Figure 11:
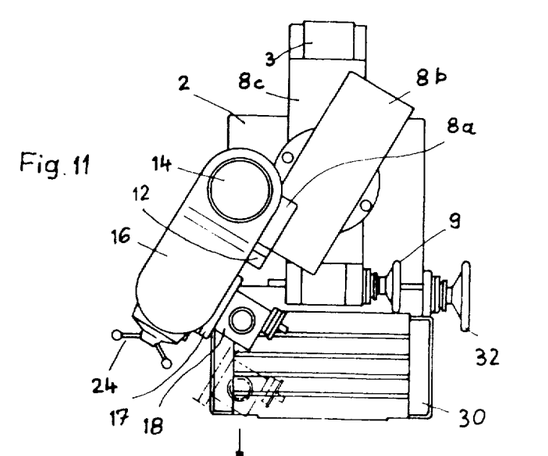
FIG. 11 is a top view of the machine according to FIG. 9, however, with the tool head in vertical position.

According to FIGS. 10 and 11, the transversely movable carriage 8 is divided into two parts by a horizontal plane and its parts 8b and 8c are relatively pivotable about a vertical axis and can be locked in position by means of a locking element 34, such as a conventional set screw. The transverse feed device 10 engages thereby the lower portion 8c of the transversely movable carriage 8 opposite the inclined carriage 5.

Figure 6:
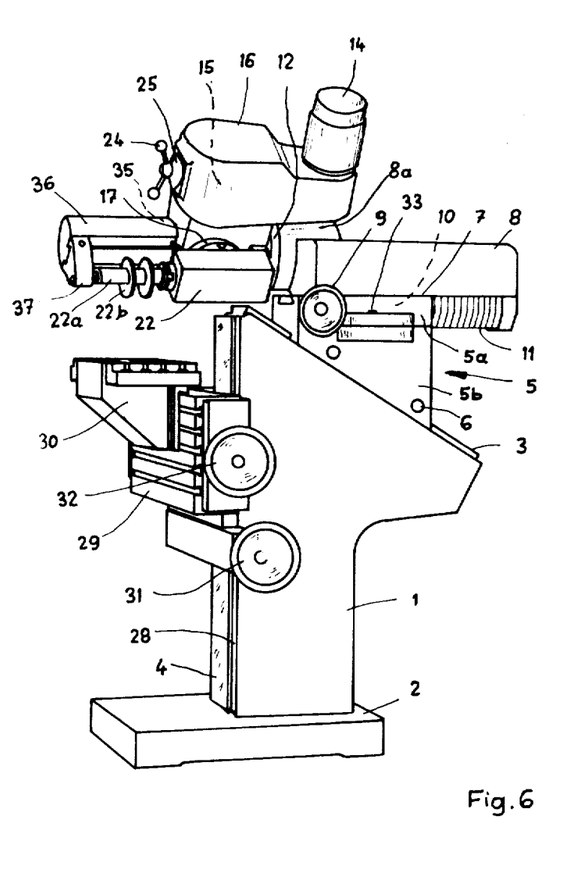
FIG. 6 illustrates a machine tool, similar to the ones according to FIGS. 2 to 5, with the tool head in horizontal position and having an overarm.
Figure 7:
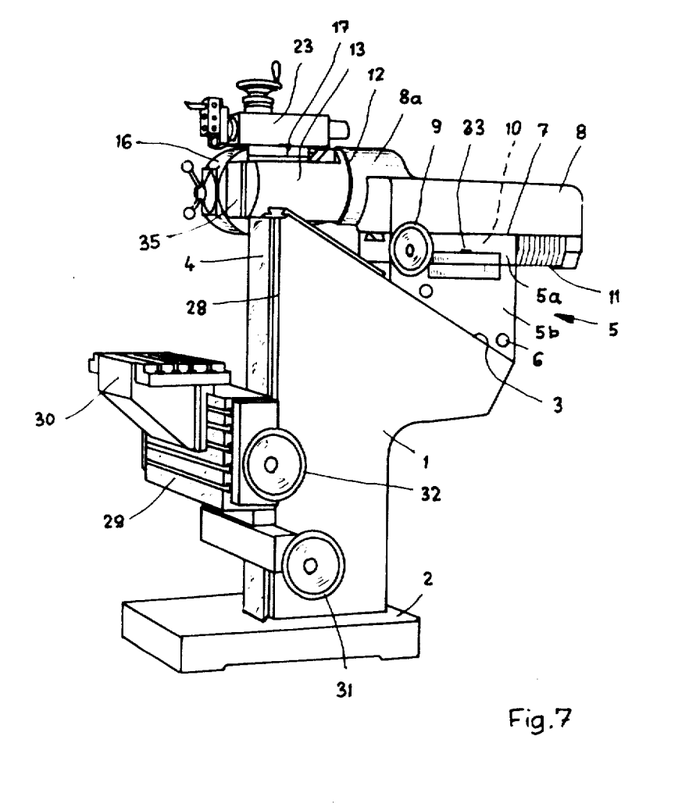
FIG. 7 illustrates the machine tool with the tool head in a horizontal position.
Figures 8, 9:
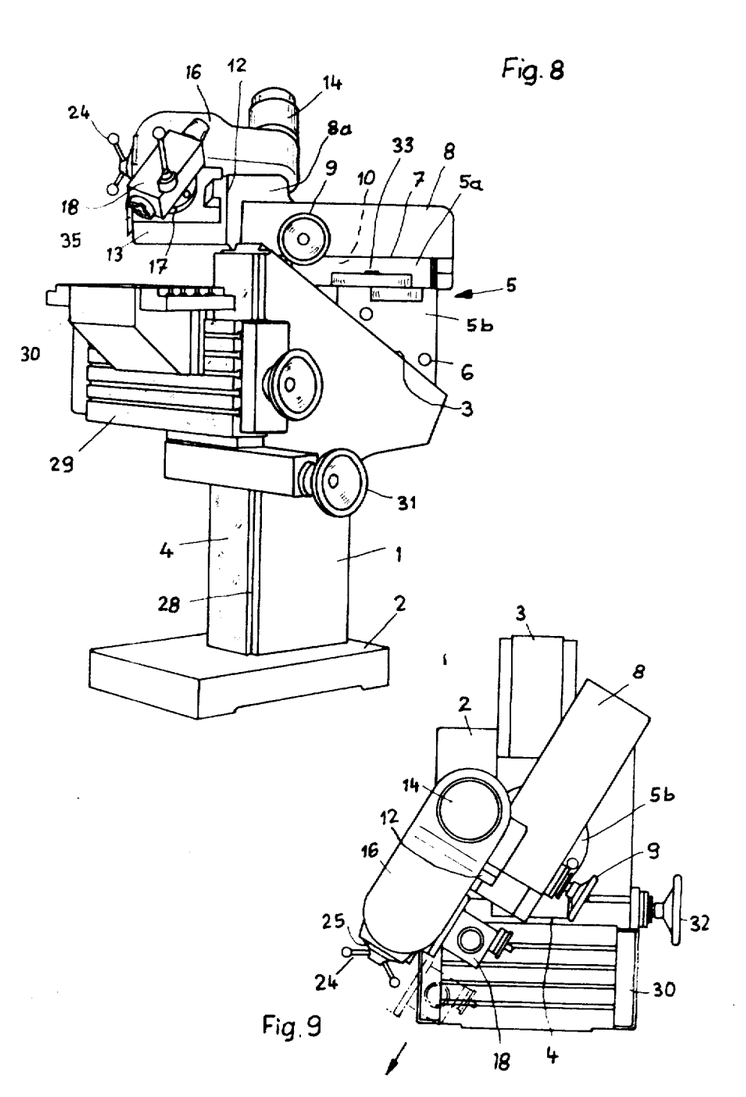
FIG. 8 illustrates the machine tool with the tool head in an off-center angular position pointing away from the front of the column.
FIG. 9 is a top view of the machine tool according to FIG. 8, however, with the tool head in vertical position.
Figure 12:
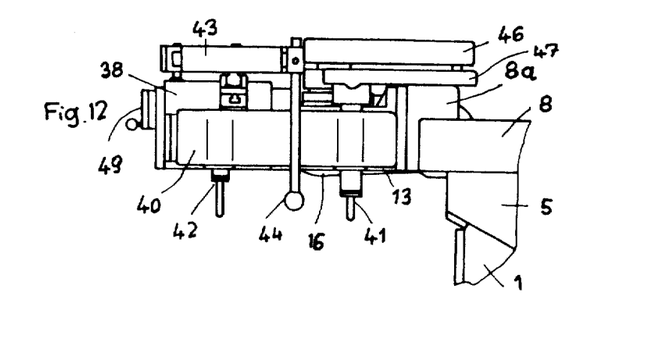
FIG. 12 is a section of a machine with a copy milling device.
Figure 13:
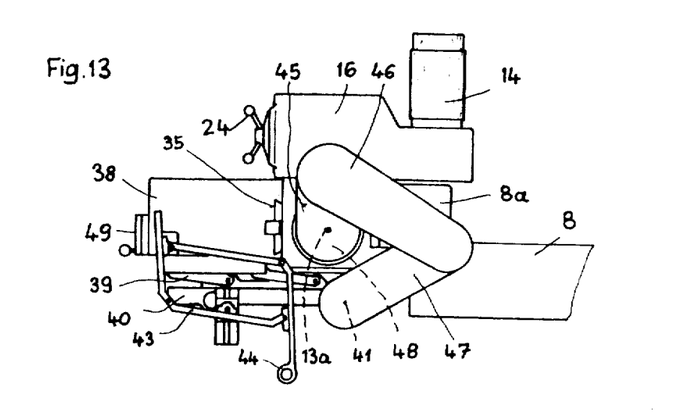
FIG. 13 is a top view of the section with the copy milling device according to FIG. 12.

According to the drawing, particularly FIGS. 6 and 13, a support 35 is provided having a prism guide for the releasable fastening of an overarm 36 and end support 37 on the overarm 36 is adjustable relative thereto. A copying device according to FIGS. 12 to 14 having a feeler mechanism or the like is provided on the side of the adapter 13, said side being that which does not face the transversely movable carriage 8.

Furthermore, according to the drawings, the adapter 13 and the tool head 18, such as a milling head with an extendible spindle, and the torque transmitting means, such as a cone-pulley drive and the drive shaft of the tool head 18 are releasably connected for applying interchangeable tool heads at this connecting point. For example, a cutter head with or without feed, a milling head 19 (FIG. 3), a grinding head 20 (FIG. 4), a ram head 21 (FIG. 5), a milling head 22 with a cutter arbor 22a — and gang cutter 22b — (FIG. 6), boring head 23 (FIG. 7) are mounted by means of a flange 17, or a driving element for the spindle of a copying device (FIGS. 12 to 14).

Figure 14:
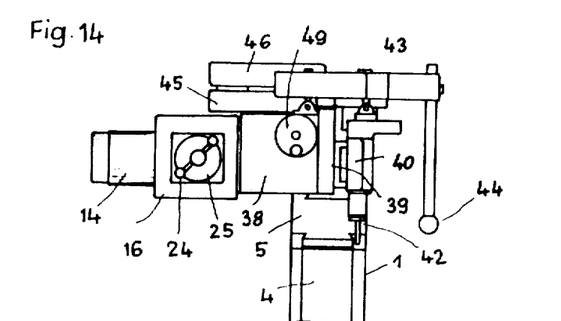
FIG. 14 is a side view of the section with the copy milling device according to FIG. 12.

According to FIGS. 12 to 14, a copying device is mounted to the adapter 13. The copying device consists of a housing 38 secured to the support 35, parallelogram guide 39, a tool carriage 40, a copy milling spindle 41 and a tracing point 42, thereby defining a pantograph having a handle 44 which permits an easier manual guiding of the tracing point 42. Three jointedly connected driving members 45, 46 and 47 are used for driving the copy milling spindle 41. The first driving member 45 is, with its driving element 48, releasably connected to the driven shaft 13a of the torque transmitting device 13B in the adapter 13. The housing 38 contains an adjustable spring balance 49 for balancing, as required, the large forces during different adjustments.

The embodiments of the invention in which an exclusive property or privilege is claimed are defined as follows:

1. A tool machine, comprising:
   base means;
   first track means on said base means inclined to the horizontal;
   first carriage means mounted on said inclined track means; and adapted for movement along said inclined track means;
   second track means on said first carriage means, said second track means being horizontally aligned;
   second carriage means including means defining a tool head mounted on said second track means and adapted for movement therealong; and
   whereby said tool head means is adjustable relative to said base means by a movement of either one or both of said first and second carriage means along said first and second track means.

2. A tool machine according to claim 1, wherein said second carriage means includes support means for supporting said tool means for movement relative to said first and second carriage means.

3. A tool machine according to claim 2, wherein said support means comprises adapter means secured to said second carriage means, said adapter means being laterally offset from said horizontal second track means.

4. A tool machine according to claim 1, wherein said first carriage means includes a pair of parts and pivot means therebetween, said second track means being provided on one of said parts whereby a pivotal movement is permitted between said second carriage means and the other of said parts.

5. A tool machine according to claim 1, wherein said second carriage means includes a pair of parts and pivot means therebetween, said tool head means being provided on one of said parts whereby a pivotal movement is permitted between said tool head means and the other of said parts.

* * * * *